United States Patent
Matthews

(10) Patent No.: US 9,552,533 B2
(45) Date of Patent: Jan. 24, 2017

(54) IMAGE REGISTRATION APPARATUS AND METHOD

(71) Applicant: Toshiba Medical Systems Corporation, Otawara-shi (JP)

(72) Inventor: James Matthews, Edinburgh (GB)

(73) Assignee: Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 13/785,406

(22) Filed: Mar. 5, 2013

(65) Prior Publication Data

US 2014/0254904 A1    Sep. 11, 2014

(51) Int. Cl.
- G06K 9/00 (2006.01)
- G06K 9/62 (2006.01)
- G06T 7/00 (2006.01)
- G06T 3/00 (2006.01)

(52) U.S. Cl.
CPC .......... *G06K 9/6212* (2013.01); *G06K 9/6203* (2013.01); *G06T 3/0068* (2013.01); *G06T 7/0024* (2013.01); *G06T 2207/30004* (2013.01)

(58) Field of Classification Search
CPC .... G06K 9/6212; G06K 9/6203; G06T 3/0068
USPC ....................................................... 382/131
See application file for complete search history.

(56) References Cited

U.S. PATENT DOCUMENTS

| | | | | |
|---|---|---|---|---|
| 5,690,106 A | * | 11/1997 | Bani-Hashemi et al. | 600/425 |
| 5,839,440 A | * | 11/1998 | Liou et al. | 600/431 |
| 6,028,969 A | * | 2/2000 | Gielow | 382/300 |
| 6,266,453 B1 | * | 7/2001 | Hibbard | G06T 3/0006 382/131 |
| 6,516,099 B1 | * | 2/2003 | Davison et al. | 382/284 |
| 6,738,532 B1 | * | 5/2004 | Oldroyd | 382/294 |
| 6,915,003 B2 | * | 7/2005 | Oosawa | 382/130 |
| 7,117,026 B2 | * | 10/2006 | Shao et al. | 600/411 |
| 7,778,490 B2 | * | 8/2010 | Quist | 382/294 |
| 7,929,775 B2 | * | 4/2011 | Hager et al. | 382/224 |
| 8,014,625 B2 | * | 9/2011 | Dewaele | 382/267 |

(Continued)

FOREIGN PATENT DOCUMENTS

JP    2011-24763 A    2/2011

OTHER PUBLICATIONS

Jiang, Hongjiang,Robb, Richard A., Holton, Kerrie S."A New Approach to 3-D Registration of Multimodality Medical Images by Surface Matching",1992,SPIE vol. 1808 Visualization in Biomedical Computing.*

(Continued)

*Primary Examiner* — Kim Vu
*Assistant Examiner* — Molly Delaney
(74) *Attorney, Agent, or Firm* — Oblon, McClelland, Maier & Neustadt, L.L.P.

(57) ABSTRACT

An image processing apparatus comprises a registration unit configured to perform a first registration between a first set of image data and a second set of data, and a second registration between the first set of image data and the second set of data. The apparatus also comprises a registrability determination unit configured to determine a difference between the first registration and the second registration, and to determine a measure of registrability between the first set of image data and the second set of data based on the difference between the first registration and the second registration.

24 Claims, 4 Drawing Sheets

(56) References Cited

U.S. PATENT DOCUMENTS

| | | |
|---|---|---|
| 8,675,944 B2* | 3/2014 | Razeto et al. ............ 382/131 |
| 2003/0233039 A1* | 12/2003 | Shao et al. ............ 600/407 |
| 2007/0160312 A1 | 7/2007 | Blaffert et al. |
| 2008/0143707 A1* | 6/2008 | Mitchell ............ 345/418 |
| 2009/0087057 A1* | 4/2009 | Parker et al. ............ 382/131 |
| 2009/0141043 A1* | 6/2009 | Guo et al. ............ 345/629 |
| 2009/0148019 A1* | 6/2009 | Hamada et al. ............ 382/131 |
| 2009/0161932 A1* | 6/2009 | Chen ............ 382/131 |
| 2010/0157325 A1* | 6/2010 | Conlon ............ 358/1.2 |
| 2010/0260392 A1* | 10/2010 | Wiemker et al. ............ 382/128 |
| 2010/0284598 A1* | 11/2010 | Zhao et al. ............ 382/131 |
| 2011/0069873 A1* | 3/2011 | Azemoto et al. ............ 382/128 |
| 2011/0142322 A1* | 6/2011 | Kabus et al. ............ 382/131 |
| 2013/0044927 A1* | 2/2013 | Poole ............ 382/131 |
| 2013/0182925 A1* | 7/2013 | Razeto et al. ............ 382/131 |
| 2013/0315459 A1* | 11/2013 | Wollenweber et al. ...... 382/131 |
| 2014/0153797 A1* | 6/2014 | Wan et al. ............ 382/128 |
| 2014/0193053 A1* | 7/2014 | Kadoury et al. ............ 382/131 |
| 2014/0206935 A1* | 7/2014 | Umasuthan et al. ........ 600/104 |

OTHER PUBLICATIONS

Ourselin, S., Roche, A., Prima, S. Ayache, N. "Block Matching: A General Framework to Improve Robustness of Rigid Registration of Medical Images",2000, Medical Image Computing and Computer-Assisted Invervention 2000, Lecture Notes in Computer Science vol. 1935.*

Rueckert, D., Sonoda, L.L., Hayes, C., Hill, D.L.G., Leach, M.O., Hawkes, D.J., "Nonrigid Registration Using Free-Form Deformations: Application to Breast MR Images", 1999, IEE Transactions on MEdical Imaging, vol. 18 No. 8.*

Stéphane Nicolau et al., "Evaluation of a New 3D/2D Registration Criterion for Liver Radio-Frequencies Guided by Augmented Reality", International Symposium on Surgery Simulation and Soft Tissue Modeling, 2003, pp. 270-283 with cover page.

Tristan Glatard et al., "Medical image registration assessment: the bronze standard method", http://www.i3s.unice.fr/~johan/publis/BronzeStandard-poster-A4.pdf, Jun. 19, 2006, 1 page.

* cited by examiner

IMAGE REGISTRATION APPARATUS AND METHOD

FIELD OF THE INVENTION

Embodiments described herein relate generally to a method of, and apparatus for, determining the registrability of sets of data, for example a method and apparatus for determining the registrability of a pair of medical image data sets that have been taken at different times or in different modalities.

BACKGROUND

In the field of medical imaging, medical images are often required to be aligned for comparison. For example, a current image of a patient may be aligned with a prior image of the same patient to assess disease progression or results of treatment, for example to compare tumor size.

It is known to compare or combine images that have been obtained by different modalities of imaging, for example X-ray computed tomography (CT) and magnetic resonance imaging (MR), to take advantage of the different information that is obtained from scans in each modality.

However, in general, the position of anatomical features will differ between different images, for example due to different patient positioning, patient movement, different modalities of imaging or different imaging parameters. In order to achieve accurate alignment of two images, it is necessary to transform one of the images so that the coordinates of each anatomical feature are the same in each resulting image. This is achieved by the process of image registration and transformation.

Rigid registration refers to a class of techniques for aligning two or more images or volumes by way of rigid transformations (transformations that involve only rotation and translation parameters). A useful application of rigid registration is for alignment of current and prior volumes in a follow-up study. Affine registration is a registration using affine transformations (rotation, translation, scaling, or shearing).

For image registration, it is sometimes useful to use rotation, translation, and a uniform scaling component. This gives a space of transformations that is more general than rigid transformations, but not as general as affine transformations.

Non-rigid registration refers to a class of techniques that use more general transformations that allow for deformation, including local deformation. These may be particularly suitable when registering images of organs or soft tissue.

Techniques for registration of images are well-known. In general, registration is an optimization problem, with the aim of finding an optimal transform between two images, which relates corresponding features in the images by mapping points in the coordinate system of one image onto the corresponding points in the coordinate system of the other image.

A similarity measure is a measure of the similarity between two images. For example, in the mutual information (MI) approach, points in each image are identified and correlated by the statistical similarity (mutual information) between the two images.

For registration of two images, one image may be kept constant and the other is transformed according to a set of parameters defined by the type of registration (for example, in rigid registration, rotation and translation parameters in the appropriate number of dimensions). The similarity measure between the two resulting images is then determined. This defines an objective function from the parameters to the similarity measure. The objective function is then optimized using an optimization function, for example, gradient descent, hill climbing or Powell optimization, to achieve an optimal transform relating the two images.

This optimal transform is applied to the second image to obtain a transformed image that is aligned with the first image, and has a common coordinate system.

Registration can be performed manually (for example, by manual selection of corresponding points on each image), semi-automatically, or automatically. Many medical imaging systems now have greater automation of registration than was previously the case.

Registration is not always successful, or even possible. Two cases of registration failure in an attempted registration of two sets of image data are described below.

In a first failure case, a good registration of the two sets of image data exists, but the registration algorithm fails to find it. In this case, it would be desirable to improve the registration algorithm to improve the chances of success.

In a second failure case, there is no possible good registration of the two sets of image data, because there is no overlap between the input data sets. For example, the two data sets that the registration algorithm is attempting to register represent images of completely different parts of the body, such as a head and a foot. In this case, no algorithm could possibly give a good registration. If an algorithm claims to find a registration for an unregistrable pair of images, this may be referred to as a blunder.

When registration of a pair of images has failed, a user may want to use an alternative method of alignment, or may want to identify that the pair of images for registration were incorrectly selected. Therefore, it is necessary for a system that is implementing a registration algorithm to be able to detect failures. Currently, most registration algorithms assume that a registration is possible, and always accept the result of the registration. This means that failed registrations, including blunders, are not detected automatically.

Registration algorithms may be evaluated by comparison to ground truth, for example, by comparison to accurate information such as that provided by a clinical expert. It is also known to evaluate registration algorithms without ground truth by considering all combinations of registrations between a set of volumes using multiple different algorithms and statistically combining the results. For this process to be most effective, many data sets and many registration algorithms are used, with considerable statistical processing. This process is used for off-line evaluation of registration algorithms.

BRIEF DESCRIPTION OF THE DRAWINGS

Embodiments are now described, by way of non-limiting example, and are illustrated in the following figures, in which.

DETAILED DESCRIPTION

Certain embodiments provide an image processing apparatus comprising a registration unit configured to perform a first registration between a first set of image data and a second set of data and a second registration between the first set of image data and the second set of data; and a registrability determination unit configured to determine a difference between the first registration and the second registration, and to determine a measure of registrability between the first set of image data and the second set of data based on the difference between the first registration and the second registration.

Figure 1:
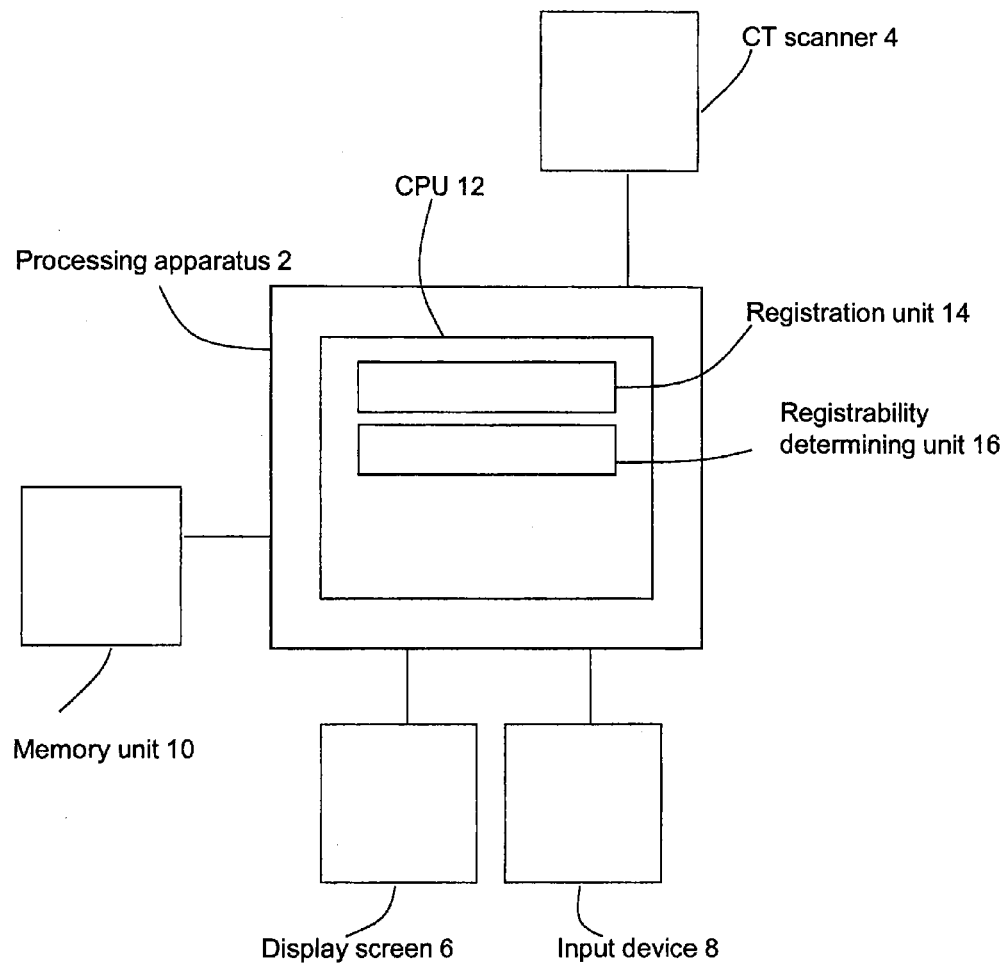
FIG. 1 is a schematic diagram of an image processing system according to an embodiment.

An image processing apparatus according to a first embodiment, which is configured to determine a measure of registrability between two sets of data, is illustrated schematically in FIG. 1. In this first embodiment, each set of data comprises CT data. In alternative embodiments, one or both of the sets of data comprises any appropriate medical image data, where medical includes veterinary. In a further embodiment, the first set of data comprises medical image data and the second set of data comprises synthesized, averaged or computer-generated data, for example data relating to a standard registration image or set of registration parameters. For example, a measure of registrability may be determined between a set of medical image data and a set of data from an atlas of human anatomy.

The image processing apparatus comprises a processing apparatus 2, in this case a personal computer (PC) or workstation, that is connected to a CT scanner 4, a display screen 6 and an input device or devices 8, such as a computer keyboard and mouse. In this embodiment, the CT scanner is one of the Toshiba Aquilion range of CT scanners. It may instead be any CT scanner that is configured to obtain three-dimensional image data. In alternative embodiments, the CT scanner is replaced or supplemented by a scanner that supports another modality of imaging, for example an MRI scanner.

In this embodiment, sets of image data obtained by the CT scanner are stored in memory unit 10 and subsequently provided to the processing unit 2. In an alternative embodiment, sets of image data are supplied from a remote data store (not shown), which may form part of a Picture Archiving and Communication System (PACS). The memory unit 10 or remote data store may comprise any suitable form of memory storage.

The processing apparatus 2 provides a processing resource for automatically or semi-automatically processing sets of image data. It comprises a central processing unit (CPU) 12 that is operable to load and execute a variety of software modules or other software components that are configured to perform the method that is described below with reference to FIG. 2.

The processing apparatus includes a registration unit 14 for performing registration of sets of data, and a registrability determination unit 16 for determining a measure of registrability between sets of data. In this embodiment, the registration unit 14 and the registrability determination unit 16 are each implemented in the processing unit 12 by means of a computer program having computer-readable instructions that are executable to perform the method of the embodiment. However, in other embodiments, each unit may be implemented in software, in hardware or in any suitable combination of hardware and software. In some embodiments, the various units may be implemented as one or more ASICs (application specific integrated circuits).

The processing apparatus 2 also includes a hard drive and other components of a PC including RAM, ROM, a data bus, an operating system including various device drivers, and hardware devices including a graphics card. Such components are not shown in FIG. 1 for clarity.

Figure 2:
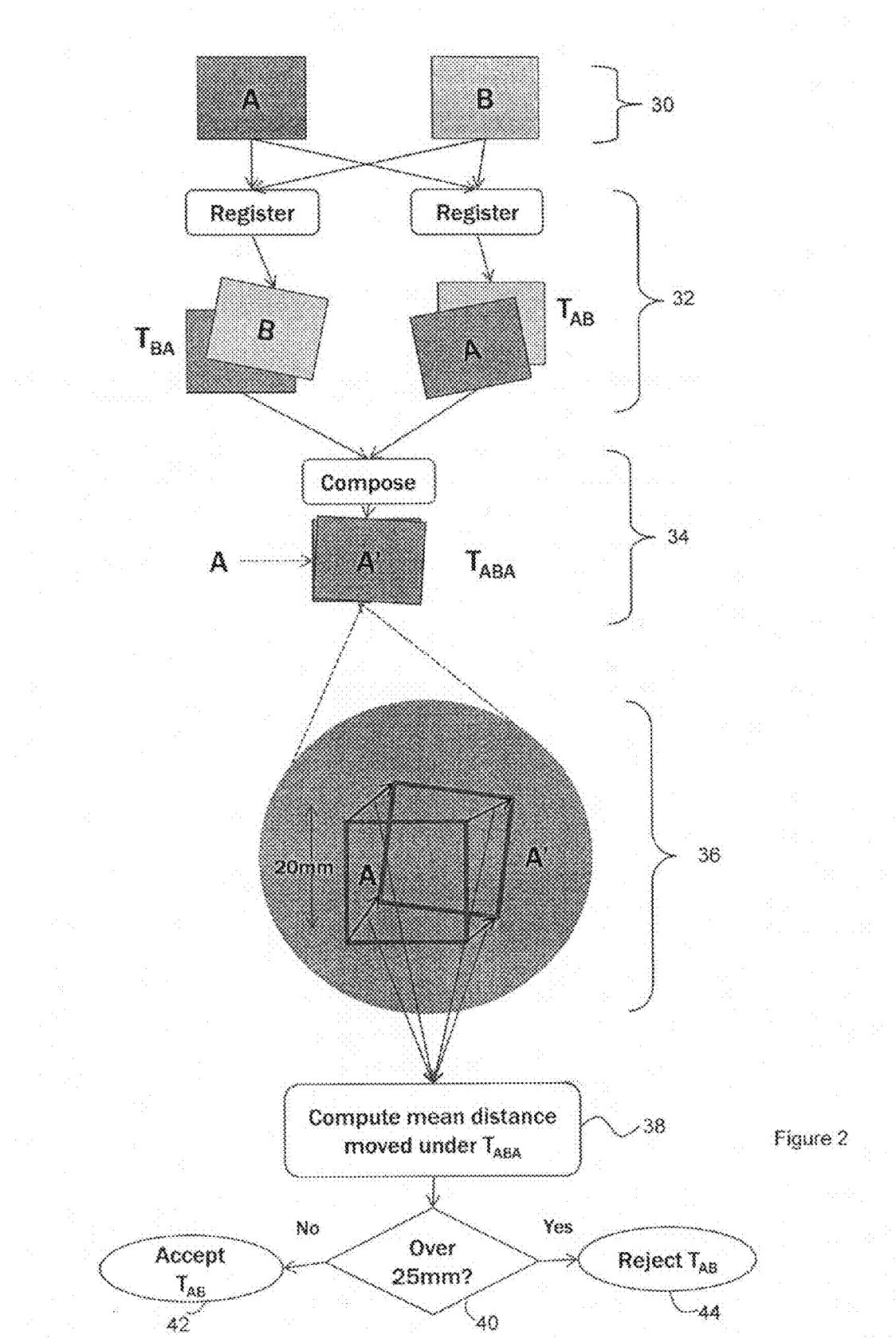
FIG. 2 is a flow chart illustrating in overview a mode of operation of the embodiment of FIG. 1.

The system of FIG. 1 is configured to perform a process having a sequence of stages as illustrated in overview in the flow chart of FIG. 2.

At the first stage 30, the processing apparatus 2 receives a first set of image data, A, and a second set of image data, B, from memory unit 10. In the current embodiment, A comprises a set of image data obtained from a recently-taken CT scan of a patient, and B comprises a set of image data obtained from a previously-taken CT scan of the same patient. Each set of image data has its own coordinate system, in which distances are defined in patient space (which is measured in millimeters).

At the second stage 32, the registration unit 14 performs two registrations between A and B using a registration algorithm. In this embodiment, the registration algorithm comprises a Powell optimization and a mutual information similarity measure.

The registration unit 14 performs a first registration in which the first set of image data A is registered to the second set of image data B. The registration unit 14 derives from this first registration a first transform $T_{BA}$, which relates points in the coordinate system of A to corresponding points in the coordinate system of B, where corresponding points represents the same feature as determined by the mutual information measure. Although the transform $T_{BA}$ is illustrated in the flowchart as a rotation, $T_{BA}$ may comprise a translation or scaling, or any combination of translation, rotation and scaling.

The registration unit 14 also performs a second registration in which the second set of image data B is registered to the first set of image data A. The registration unit 14 derives from the second registration a second transform $T_{AB}$, which comprises any combination of translation, rotation and scaling. In an alternative embodiment, each of $T_{BA}$ and $T_{AB}$ comprises a rigid transformation. In a further embodiment, each of $T_{BA}$ and $T_{AB}$ comprises an affine transformation.

In this embodiment, the registration algorithm that is used is not a symmetric algorithm. The second transform $T_{AB}$ (registration from B to A) is not the inverse of the first transform $T_{BA}$ (registration from A to B). Therefore the first registration and the second registration are expected, in many cases, to result in a somewhat different alignment of points between the two sets of image data.

In an additional embodiment, $T_{AB}$ and $T_{BA}$ may be combined to give a symmetric registration algorithm incorporating detection of registration failures, with potentially higher accuracy than the original registration algorithms.

At the next stage 34, the registrability determination unit 16 combines the first transform $T_{BA}$ and the second transform $T_{AB}$ by matrix multiplication to generate a round trip matrix $T_{ABA}$. As $T_{AB}$ is not constrained to be the inverse of $T_{BA}$, $T_{ABA}$ is not by definition the identity matrix. $T_{ABA}$ is used to derive a measure of the difference between the first registration and the second registration, as detailed below. If this difference is small, $T_{ABA}$ is close to the identity transform.

At stage 36, the registrability determination unit 16 selects a set of points within the coordinate system of A. In this embodiment, the points that are selected are the eight corners of a cube in the coordinate system of A. The cube has an edge length of 20 mm and the center of the cube is the center of the region, in this case the volume, represented by the first set of image data A according to the coordinate system of A. In this case, the cube does not relate to any structure or feature already existing in the first set of image data A, but is constructed for the purpose of determining the measure of registrability.

For each point, v, the registrability determination unit performs a transformation process that comprises computing a transformed point, v', by applying the round-trip matrix, $v'=T_{ABA}v$. The registrability determination unit 16 then computes the Euclidean distance in millimeters between v and v' for each of the eight selected points.

At stage 38, the registrability determination unit 16 calculates the mean of the eight Euclidean distances. This mean distance is a measure of the difference between the first registration and the second registration. If the registrations are very similar, the mean distance will be small. If there is a significant difference between the registrations, the mean distance will be higher.

At stage 40, the registrability determination unit 16 determines a measure of registrability between the first set of image data A and the second set of image data B by comparing the mean distance to a threshold value. If the mean distance is less than or equal to 25 mm, the registration is taken to be successful (the measure of registrability equals 1). If the mean distance is greater than 25 mm, the registration is taken to be unsuccessful (the measure of registrability equals 0).

In alternative embodiments, instead of the mean distance as above, an alternative distance measure is calculated. The distance measure in certain embodiments is the distance moved by a single point, a weighted average distance between points, a standard deviation between the eight (or other number of) distances, the variance of the eight (or other number of) distances, or any other suitable measure. In other embodiments, the measure of the difference between the two registrations is not a distance. Any of these distances or measures may have a threshold applied to determine a measure of registrability.

Any suitable number of selected points can be used in different embodiments. For example, in some embodiments between 3 and 10, or between 3 and 50, or between 3 and 100 selected points are used.

In further embodiments, the measure of registrability is a probability level or confidence level rather than a binary value. In one embodiment, the mean distance calculated above is used to determine a measure of registrability that is a probability value, in which a mean distance of zero corresponds to a probability of registration of 100%.

Stage 40 is a decision point in the flowchart. If the measure of registrability is 1 (successful registration), the next stage is stage 42. At stage 42, the registration is accepted. The second set of image data, B, is transformed using the second transform, $T_{AB}$. Images from the first set of image data and the transformed second set of image data are displayed together on display screen 6 in an aligned format.

If the measure of registrability is 0 (unsuccessful registration), the next stage after stage 40 is stage 44. At stage 44, the registration is rejected. The user is notified of the failure by a message on display screen 6. An image from the first set of image data A and an image from the second set of image data B are displayed to the user in their original forms with no attempt at alignment. The user then determines whether, for example, the system had tried to register two sets of image data A and B in which there is no overlap in the data. In this case, the user may start the process of FIG. 2 again with a different pair of initial sets of image data. Alternatively, if the displayed images appear to the user to be registrable, the user may attempt a manual registration of A and B. In some embodiments, the registration unit reverts automatically to an alternative registration method in the case of the rejection of a registration by the registrability determination unit.

Therefore, in an embodiment, the difference between two registrations is measured by calculating a mean distance. The mean distance is used to determine a measure of registrability. The measure of registrability is used to accept or reject automatic registration for comparison of current and prior subjects of the same study.

Figure 3:
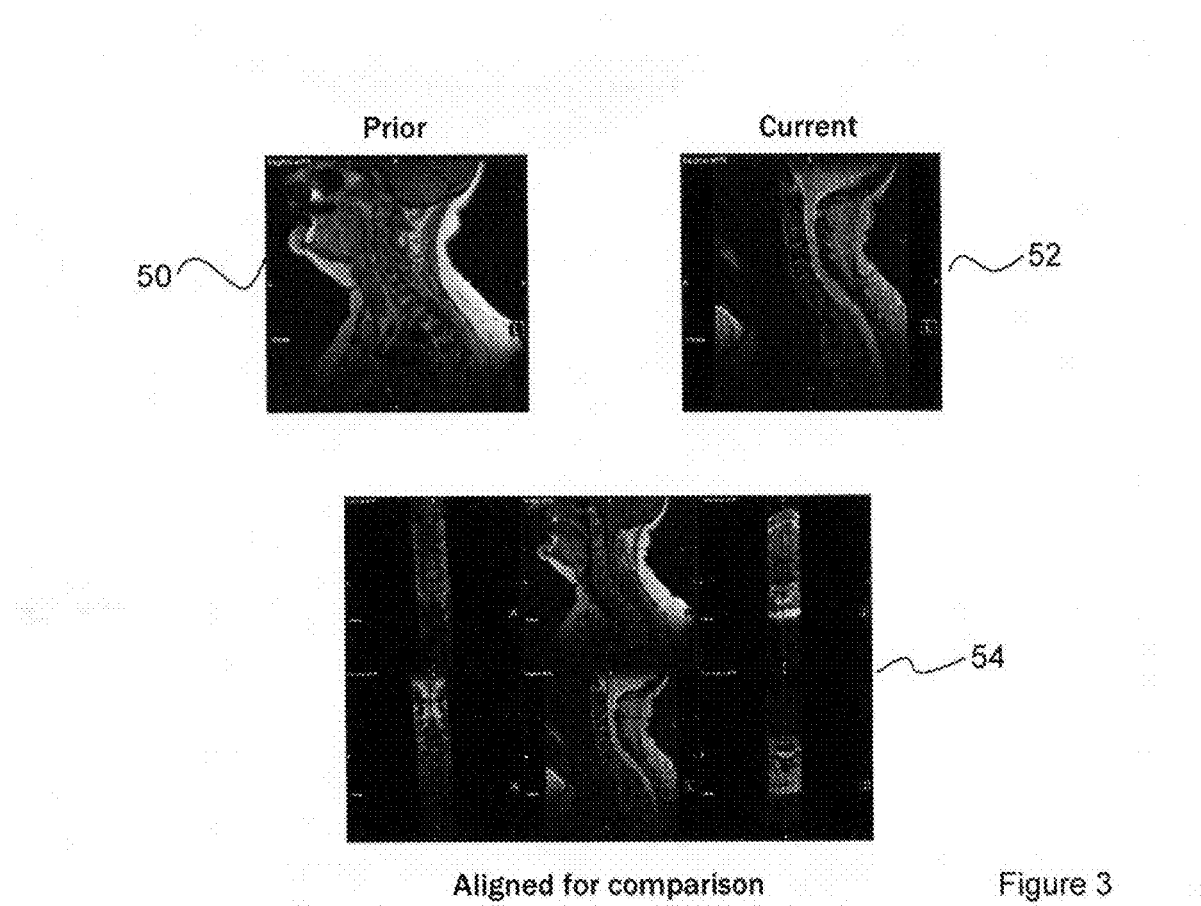
FIG. 3 is an illustration of two images that are registrable, and the aligned images that result from their registration.
Figure 4:
FIG. 4 is an illustration of two images that are not registrable.

FIG. 3 and FIG. 4 illustrate registrable and unregistrable images. Although the images of FIG. 3 and FIG. 4 are MR images, similar considerations apply to CT images, and to images from any other appropriate modality.

FIG. 3 illustrates two images 50 and 52 that are registrable, and a view 54 in which they are aligned for comparison, having been registered. A first registration and a second registration of the set of image data relating to image 50 and the set of image data relating to image 52 would be expected to result in a small difference between the registrations, a mean distance well below 25 mm, and a measure of registrability of 1.

FIG. 4 illustrates two images 60 and 62 that it is not possible to register, because there is no overlap in the image data. Image 60 is an image of a foot, and image 62 is the image of a head. When two sets of image data relate to non-overlapping areas of the body, registering the first set of image data to the second will usually give a significantly different result from registering the second to the first, as both results will be spurious. Therefore it is expected that in this scenario there will be a large difference between the two registrations, the mean distance will be greater than 25 mm, and the measure of registrability will be 0.

The process of the current embodiment may be used for evaluation of registration results in a deployed system. The process can be used in relation to any two-dimensional or three-dimensional medical image data for which a registration algorithm exists. In one embodiment, a comparison protocol exists where registration is performed directly between the displayed volumes. When a failure case occurs, the system automatically falls back to manual registration.

In general, registration is an optimization problem using some similarity measure. The final value of this similarity measure could perhaps be used to estimate a measure of registrability. However, the final value of the similarity measure can vary significantly depending on noise, modality, sequence (for MR) and many other factors. There may not be a good correlation between final similarity measure value and the final registration quality, as judged by comparison to manually-created ground truth, whereas the distance measure or measure of registrability derived above does correlate well with registration quality.

Figure 5A:
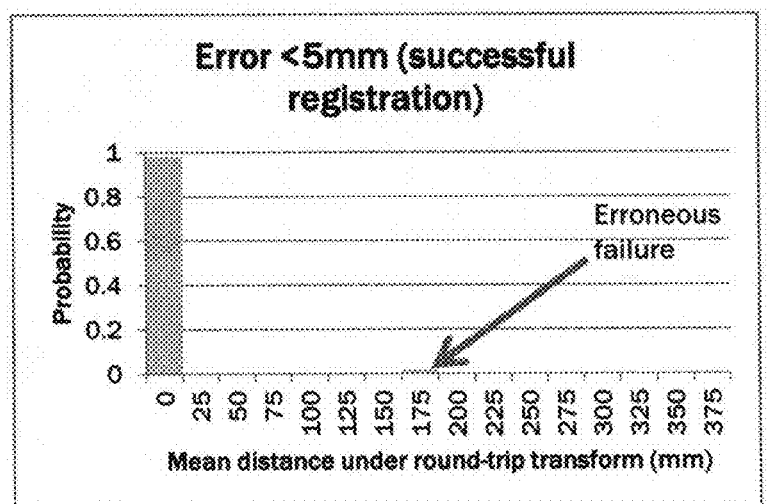
FIGS. 5a and 5b are histograms of the measure of registrability of successful and unsuccessful registrations under a prototype implementation.
Figure 5B:
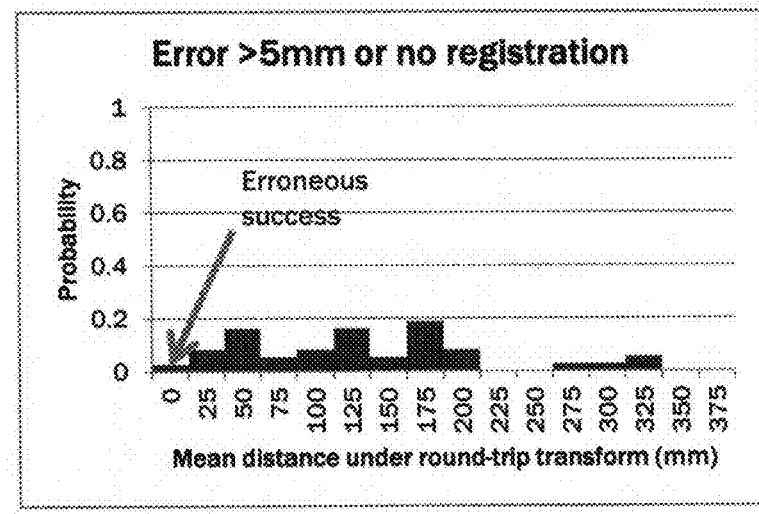

In a prototype implementation, the method outlined in FIG. 2 was implemented in a registration system for registering sets of medical image data. It was then tested on test data for which registrability had already been determined by another method. In this previous registrability determination, a clinical expert defined several corresponding points (ground truth points) on each pair of sets of image data. The average distance between these corresponding points after alignment was measured. A least-squares fit of a rigid transformation to these ground truth points was performed to find the minimum distance that rigid registration could possible achieve. If the measured distance was within 5 mm of the minimum, the registration was considered successful. Otherwise, the registration was considered a failure. In the titles for the histograms of FIG. 5, this measured distance is referred to as the error, and an error of less than 5 mm indicates a successful registration. FIG. 5a shows results for the pairs of sets of image data that has been determined to be successes (<5 mm) in the previous registrability determination. FIG. 5b shows results for the pairs of sets of image data that had been determined to be failures (>5 mm or no registration) in the previous registrability determination.

The test data comprised:

55 success cases, consisting of: 53 success cases in which both sets of image data comprise MR data, and two success cases in which a first set of image data comprises CT data and a second set of image data comprises MR data.

37 failure cases, consisting of: 17 failure cases in which a first set of image data comprises CT data and a second set of image data comprises MR data; one failure case in which both sets of image data comprise MR data, and 19 failure cases in which both sets of image data comprise MR data but there is no overlap between the two data sets.

In the prototype implementation, the process of FIG. 2 correctly identified 36 of 37 failure cases, and 54 of 55 success cases, using a threshold of 25 mm.

FIG. 5a is a histogram of results for the success cases. The histogram bins are the mean distance of the selected points under the round trip transform. The height of each bar represents the number of cases that fell into the corresponding bin, where the total number of cases is normalized to 1. In the prototype implementation, 54 of 55 cases fell into the first histogram bin, in which the mean distance under the round-trip transform is below 25 mm, indicating a successful registration. One case exhibited an erroneous failure. In this case, the data was noisy and the registration algorithm found an incorrect local optimum.

FIG. 5b is a histogram of results for the failure cases. Again, the bins are the mean distance and the height of each bar represents the number of cases in that bin, with the total number of failure cases normalized to 1. The values of the mean distance under the round-trip transform show considerable variation, which is to be expected when the results of each registration are essentially spurious. 36 of 37 tested cases fall into bins that represent a mean distance under the round trip transform of more than 25 mm. One case exhibited an erroneous success, in which the difference between the two registrations was small. This occurred by chance.

In the first embodiment described above, and implemented in the prototype, two registrations were performed between two sets of image data, where the first registration was a registration from the first set of image data to the second set of image data, and the second registration was a registration from the second set of image data to the first set of image data. The same registration algorithm was used, but in different directions. There was a small difference in the registrations where the sets of image data were registrable, and a large difference in registration where the sets of image data were not registrable.

It is possible to construct many other pairs of registrations that have a similar property: a small difference between the first registration and the second registration when the two sets of image data are registrable, and a large difference when they are not. For each of these pairs, the registration procedure used for the second registration may be seen as a variation, or perturbation, of the registration procedure used for the first registration. In the case above, the variation comprised performing the registration in the opposite direction. Alternative minor variations may comprise making a small change to the registration algorithm used in one of the registration procedures compared to that used in the other of the registration procedures, changing the initial conditions the registration algorithm, making a small change to one or both of the sets of image data, or any other change that has the desired property. In each case, the basic registration algorithm used may the same for the second registration as for the first registration, with changes being made to its implementation. A registration algorithm can include a number of fixed parameters. Variations of the algorithm in some embodiments comprise varying the number or value of the fixed parameters.

The registration algorithm comprises a number of parameters for optimization. For example, for the registration algorithm of the first embodiment, these parameters comprise rotation, translation and scaling parameters for each of three orthogonal axes. Additionally, the registration algorithm comprises variables that do not have a physical meaning, but instead govern the performance of the algorithm. These may comprise tuning parameters, constants, initial settings and other variables. These variables are tuned in the development of the algorithm to achieve stable algorithm performance. They are tuned such that, for good input data such as two registrable sets of image data, changing the tuning parameters by a small amount should achieve a substantially similar registration, and should not result in much change in the final, optimized value of the similarity measure.

If there is a good registration for a given pair of images, it is expected that a pair of registrations in which the method of the second registration is a minor variation of the method of the first registration will find approximately the same alignment, with a global optimum value for the similarity measure. In contrast, if there is no good registration, minor variations are likely to result in substantially different alignments, with spurious local optima.

In one embodiment, the variation between the first registration method and the second registration method is that a tuning parameter in the registration algorithm is changed by 5% between the first registration and the second registration.

In another embodiment, the registration algorithm requires an initial start point for the registration to be set. The variation between the first registration method and the second registration method is that the start point for the second registration is moved by 5 mm relative to the start point for the first registration.

In a further embodiment, the registration algorithm is computed by random sampling. In this case, a random seed is required to start the algorithm. Two registrations are performed, in which the random seed used to start the second registration is different from the random seed used to start the first registration.

In an additional embodiment, the same registration algorithm is used for the first registration as for the second registration. However, a noise component is added to the second set of image data when the second registration is performed.

In each of these embodiments, the second registration is performed in the same direction as the first registration: for each of the first and second registrations, the first set of image data is registered to the second set of image data. Once again, the difference between the registrations is measured by deriving a first transform from the first registration and a second transform from the second registration, and combining these to form a round-trip transform. However, in this case this is achieved by multiplying the first transform by the inverse of the second transform, rather than multiplying the two transforms as in the first embodiment.

The resulting round-trip transform has similar characteristics to the round-trip transform described in the embodiment of FIG. 1 and FIG. 2 above. When there is a small difference between the first registration and the second registration, the round-trip transform is close to the identity transform.

After the round-trip transform is obtained, stages 36 onwards of FIG. 2 are applied in the same way as detailed in the first embodiment. Eight points are selected, and the round-trip transform is applied to the each of the eight points to obtain a mean distance that is a measure of the difference between the registrations. A threshold is then used to determine a measure of registrability.

In further embodiments, more than two registrations are performed between the first set of image data and the second set of image data. Any appropriate minor variations may be used. In one embodiment, the registration unit 14 performs five registrations between the first set of image data and the second set of image data, using the same registration algorithm but with a different random seed for each of the five registrations. The registration unit 14 derives respective transforms for each of the five registrations. A selected set of points is transformed using each of the derived transforms. The registrability determination unit 16 calculates the standard deviation between the resulting points. The registrability determination unit 16 determines a measure of registrability from the calculated standard deviation.

At stage 36 of the method described above and illustrated in FIG. 2, the registrability determination unit 16 selects a set of points to undergo the round-trip transform. In the first embodiment, the points selected were the corners of a cube constructed around the center of the coordinate system of the first set of image data, A. However, in principle, any set of points in the coordinate system may be selected. It is preferable that the points should be near the center of registration, where the center of registration is the center of the region that is featured both in the first image and in the second image. It is also desirable that the points should be near the part of the image that is most clinically significant, as this is where the best registration is required. Neither of these characteristics can be known a priori from the sets of image data. However, the center of the first set of image data is likely to be close to both the center of registration and the most clinically significant area, since usually each of the images is framed so that it is centered on the feature of most clinical importance. Therefore, selecting points at stage 36 that are around the center of the coordinate system of A is preferable.

For example, points may be selected such that all selected points are closer to the center of the image coordinate system than they are to the edge of the coordinate system. For each selected point and for every point on the edge of the coordinate system, the distance from the center of the coordinate system to the selected point is less that 50% of the distance from the center of the coordinate system to the point on the edge of the coordinate system.

Another advantage of selecting points near the center of the image is that they are least affected by rotation. If an image is rotated around its center, a point at the edge of the image experiences a greater displacement in millimeters than a point at the center of the image. Selecting points near the center of the image is likely to minimize the movement of the points under the calculated transform. Points may be selected in a geometrical arrangement, or random point selection may be used. In this first embodiment, the corners of a cube are selected because this gives an equal sensitivity to changes in each of the three axes, since the cube's sides are of the same length and orthogonal. Alternatively, a grid of points may be selected, preferably with substantially uniform spacing of points along each of three orthogonal directions. Similar considerations apply to a 2D image, on which points on a square or other geometrical figure or grid may be selected. It is preferable for points to be distributed substantially symmetrically about the center of the coordinate system, again so that there is equal sensitivity in different directions.

The first embodiment above described the registration of a pair of sets of image data. The following embodiments describe the registration of multiple pairs of sets of image data.

In one embodiment, the scanner is an MRI scanner. A first plurality of sets of image data (denoted A1, A2, A3 etc) and a second plurality of sets of image data (denoted B1, B2, B3 etc) are retrieved from the memory unit 10. It is known that there is correspondence between some or all of the sets of image data in the first plurality and corresponding sets of image data in the second plurality, but it is not known which sets of data are related. A variant of the process of FIG. 2 is used to select which pair or pairs of sets of image data will be registered.

At stage 30, the processing apparatus 2 receives a first set of image data from the first plurality, for example A1, and a second set of image data from the second plurality, for example B3. At stage 32, the registration unit 14 performs a first registration and a second registration. The method of the second registration differs from the method of the first registration by a minor variation as described above. The registration unit 16 generates a first transform (for example, $T_{B3A1}$) and a second transform (for example, $T_{A1B3}$).

At stage 34, the registrability determination unit 16 combines these transforms into a round-trip transform ($T_{A1B3A1}$), which it applies to a selected set of points (stage 36), in this case the corners of a cube at the center of the coordinate system of the first set of image data. At stage 38, the registrability determination unit 16 then calculates the mean distance moved by the selected points under the round-trip transform. The mean distance is stored in memory.

The processing apparatus 2 then repeats this process from stage 30 to stage 38 with a pairing of a third set of image data from the first plurality and a fourth set of image data from the second plurality. This is repeated for all possible pairings until a mean distance has been calculated for each possible pairing.

The registrability determination unit 16 then uses mean distance as a measure of registrability to determine which pairs of image sets are most registrable. The numerical value of the measure of registrability for a pairing equals the mean distance for that pairing. For this measure of registrability, a lower value of the measure of registrability indicates a better registration (a lower mean distance resulting from the round trip transform).

The pairings are sorted according to the measure of registrability as follows. Each possible pairing is listed with its associated measure of registrability as determined above. The pairing with the lowest measure of registrability is deemed to be the most registrable pair. For example, this may be A2 and B1. In this case, the registration of A2 and B1 is accepted. B1 is transformed using the transform $T_{B1A2}$ so that the transformed B1 is aligned with A2. All other pairings which involved B1 or A2 are removed from the list.

Each remaining pairing is then listed with its associated measure of registrability and the next most registrable pair is determined. In one embodiment, this process is continued until all sets of image data are paired. In another embodiment, pair selection continues until the most registrable pair remaining has a measure of registrability that is above a threshold, in this embodiment a mean distance above 25 mm. At this point the pair selection process stops and any remaining images are left unpaired.

The pair selection method above may be used in any situation where a plurality of sets of image data are required to be associated pairwise by the quality of registration between each possible pair, where the correspondence between sets of image data is not known, and where each plurality of sets of image data does not have a common coordinate system, or frame of reference.

In a further embodiment, a first plurality of sets of image data (A1, A2, A3 etc) and a second plurality of sets of image data (B1, B2, B3 etc) are retrieved from the memory unit 10. The first plurality comprises different sets of image data that were taken as part of a first MRI scan, and share a first global coordinate system. The different sets of image data may represent different parts of the body.

The second plurality comprises different sets of image data that were taken as part of a second MRI scan, and share a second global coordinate system. There is not necessarily a one-to-one correspondence between body regions in the two pluralities.

In alternative embodiments, the sets of image data are from CT scans or any other appropriate three-dimensional scan, or one plurality of sets of data is taken from an atlas.

This embodiment is used in a pre-processing environment, to register between these two coordinate systems, also called frames of reference, with each coordinate system having multiple image volumes represented by multiple data sets.

The spatial relationship between A1, A2, A3 etc is known, as they share a common global coordinate system. Similarly, the spatial relationship between B1, B2, B3 etc is known. In this case, to align all the scans, it is only necessary to have one good registration between a first set of image data from the first plurality and a second set of image data from the second plurality. It is not necessary to perform all registrations between the images. Therefore, the following procedure is followed.

A first subset comprising a number, m, of sets of image data is selected from the first plurality of sets of image data, and a second subset, also comprising m sets of image data, is selected from the second plurality. In one example, m=3: three sets of image data are selected from each plurality. The selection may be random, or it may be based on some suitable heuristic. For example, the selected sets of image data may be those that have the largest volume.

At stage 30, the processing apparatus 2 receives a first set of image data from the first subset, for example A1, and a second set of image data from the second subset, for example B3. At stage 32, the registration unit 14 performs a first registration and a second registration and generates a first transform ($T_{B3A1}$) and a second transform ($T_{A1B3}$). At stage 34, the registrability determination unit 16 combines these transforms into a round-trip transform ($T_{A1B3A1}$), which it applies to a selected set of points (stage 36). Note that in this case, the selected set of points comprises the corners of a cube at the center of the coordinate system of the first set of image data, not the center of the global coordinate system. At stage 38, the registrability determination unit 16 calculates the mean distance moved by the selected points under the round-trip transform. The transforms and the mean distance are stored in memory.

The processing apparatus 2 then repeats this process from stage 30 to stage 38 with a different pairing of a set of image data from the first subset and a set of image data from the second subset. This is repeated for all possible pairings within the subsets until transforms and a mean distance have been calculated for each possible pairing.

For example, where m=3 for each subset, there is a total of 18 transforms (a first and a second transform for each of 9 possible pairings) and 9 mean distances (one for each possible pairing).

The registrability determination unit 16 then looks for a subset of the set of transforms with a minimum size k (for example, k=3, a subset of 3 transforms), such that every pair of transforms in the subset has good registrability. This subset, or an average of the subset, should give good alignment of all scans.

It is not necessary to restrict the pairings to transformations between the same two scans. For example, it is possible to use $T_{A1B3}$ and $T_{B2A2}$ and still get a valid round-trip transform, due to the shared global coordinate system between A1 and A2, and the shared global coordinate system between B2 and B3.

If there is no subset of the set of transforms of size k for which every pair of transforms in the subset has good registrability, the process is repeated with a larger value of m (a larger selected set of scans) until there is a subset of the set of transforms of size k for which every pair of transformations has good registrability. Increasing m (the number of sets of image data) makes it more likely that there will be a subset of the set of transforms of size k for which every pair of transformations has good registrability. However, increasing m also increases the time taken.

Robustness can be traded against speed by adjusting the size k, as well as the threshold for good registrability. For example, if occasional inaccurate results are obtained with k=3, then k may be increased to 4. It would take longer to find a successful result, but the chance of an inaccurate result would be lower.

In an example of this embodiment, the sets of image data represent CT torso scans. It is not uncommon for a CT study to contain a full body scan (neck to lower abdomen), as well as separate lung and abdomen scans with specialized reconstruction kernels. All three scans are taken at the same time, and therefore have the same global coordinate system. A follow-up study of the same patient may contain two or more scans of the abdomen, but none of the lungs. Many registrations may be performed, but all that is needed is a single transform that can be used to relate all of the images in the first scan to all of the images of the second scan.

In a further embodiment, the processing apparatus 2 again receives from the memory unit 10 a first plurality of sets of image data that were taken in a first MRI scan and a second plurality of sets of image data that were taken in a second MRI scan. Once again, each plurality comprises sets of image data relating to different parts of the body, and each plurality has a global coordinate system.

Because all the sets of image data from the first scan share a first global coordinate system, and all the sets of image data from the second scan share a second global coordinate system, it may be expected that successful registrations between sets of image data in the first plurality and sets of image data in the second plurality may result in similar transforms. For example, the transform that relates the first head scan and the second head scan will be similar to the transform that relates the first torso scan and the second torso scan.

In this embodiment, the sets of image data from the first MRI scan and the sets of image data from the second MRI scan are associated pairwise and registered, either by the matching method described above or by any other method, for example, manual selection of pairs of images. For each pairing, the registrability determination unit 16 determines a measure of registrability, which may be the same as the mean distance as above, or any suitable measure of registrability.

It is found that, in practice, some registrations are better than others. For example, a good registration is achieved between the sets of image data relating to the head, but the registration between the sets of image data relating to the torso images is poorer. This may be the case, for example, when one or both of the torso images is noisy. It is also known from empirical evidence that larger sets of image data have a better chance of good registration.

The quality of registration may be assessed by comparing or thresholding the measure of registrability, or by any other method. It is not necessary that the poorer registration is an unsuccessful registration. For example, the head registration has a mean distance of less than 1 mm and the torso registration has a mean distance of 15 mm. Both are below a 25 mm threshold, but the torso registration is clearly poorer than the head registration.

In this case, a transform obtained from the good registration may be used to transform one of the images in the pair that had the poorer registration, to align them better than was achieved in the original registration between them.

This is particularly valuable where the images are likely to be noisy, for example in MR images. Noisy images may be transformed using a registration that has been derived from less noisy images, or from images with more easily distinguishable features. However, this method may also be used for any situation with two pluralities of sets of image data in which it is anticipated that registrations may be similar between different pairs of images.

Any suitable image data may be registered according to alternative embodiments, and the data is not limited to being CT or MRI data. For example, positron emission tomography (PET) or single-photon emission computed tomography (SPECT) scans may also be registered. It is common to register PET or SPECT to CT or MR. However, PET-PET or SPECT-SPECT registration is also possible, although less usual.

It will be well understood by persons of ordinary skill in the art that whilst embodiments implement certain functionality by means of a computer program having computer-readable instructions that are executable to perform the method of the embodiments. The computer program functionality could be implemented in hardware (for example by means of CPU). However, the embodiments may also be implemented by one or more ASICs (application specific integrated circuit)) or by a mix of hardware and software.

Whilst particular units have been described herein, in alternative embodiments functionality of one or more of those units can be provided by a single unit, processing resource or other component, or functionality provided by a single unit can be provided by two or more units or other components in combination. Reference to a single unit encompasses multiple components providing the functionality of that unit, whether or not such components are remote from one another, and reference to multiple units encompasses a single component providing the functionality of those units.

While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. An image processing apparatus comprising:
a circuit configured to
perform a first global registration procedure on a first set of image data and a second set of image data to obtain a first global registration between the first set of image data and the second set of image data, and to perform a second global registration procedure on the same data of the same first set of image data and the same data of the same second set of image data to obtain a second global registration between the same first set of image data and the same second set of image data, wherein the first global registration procedure is different from the second global registration procedure;
determine a difference between the first global registration and the second global registration, and to determine a measure of registrability between the first set of image data and the second set of data based on the difference between the first global registration and the second global registration;
accept or reject registration of the first set of image data and the second set of image data depending upon the measure of registrability; and
provide an indication that registration of the first set of image data and the second set of image data has been rejected and output, without registration, at least one of the first and second sets of image data when the registration is rejected,
wherein the first global registration procedure includes obtaining a registration from the first set of image data to the second set of data and the second global registration procedure includes obtaining a registration from the second set of data to the first set of image data, or both.

2. An apparatus according to claim 1, wherein the circuit is configured to reject registration of the first set of image data and the second set of image data when the measure of registrability is below a predetermined threshold.

3. An apparatus according to claim 2, wherein the circuitry is further configured to automatically revert to an alternative registration method when the registration is rejected.

4. An apparatus according to claim 1, wherein in determining the difference between the first global registration and the second global registration the circuit is further configured to
derive a first transform from the first global registration;
derive a second transform from the second global registration; and
determine a difference between the first global registration and the second global registration using the first transform and the second transform.

5. An apparatus according to claim 4, wherein in determining the difference between the first global registration and the second global registration the circuit is further configured to combine the first transform and the second transform to generate a round-trip transform.

6. An apparatus according to claim 1, wherein the circuit is configured to determine a distance measure representative of the difference between the first global registration and the second global registration, and to determine the measure of registrability from the distance measure.

7. An apparatus according to claim 6, wherein the distance measure is representative of a distance between a position of at least one point before and after transform of the at least one point according to a transformation process, wherein the transformation process includes applying at least one transform derived from the first global registration and the second global registration.

8. An apparatus according to claim 7, wherein the transformation process includes applying a first transform derived from the first global registration, and applying a second transform derived from the second global registration.

9. An apparatus according to claim 6 wherein the distance measure is the mean of a plurality of distances, and wherein each of the plurality of distances is a distance between the position of a respective point before and after transformation of that point according to the transformation process, the circuit determines the measure of registrability in dependence on a comparison of the distance measure to a threshold, or both.

10. An apparatus according to claim 1, wherein the first global registration includes registration from the first set of image data to the second set of data, and the second global registration includes a registration from the second set of data to the first set of image data.

11. An apparatus according to claim 1, the second global registration procedure is a variant of the first global registration procedure.

12. An apparatus according to claim 11, wherein a registration algorithm using in the second global registration procedure differs from a registration algorithm used in the first global registration procedure by at least one of a value of at least one registration algorithm parameter and a number of registration algorithm parameters.

13. An apparatus according to claim 11, wherein the first global registration procedure differs from the second global registration procedure by at least one of
a difference in initial conditions of one of the first global registration and second global registration in comparison to the other of the first global registration and the second global registration, a different random seed, a noise component added to at least one set of image data, and a different value of a start point of registration.

14. An apparatus according to claim 1, wherein the circuit is configured to perform at least three registrations between the first set of image data and the second set of data, and measure of registrability from differences between the three registrations.

15. An apparatus according to claim 1, wherein in determining the difference, the circuit applies the first global registration and the second global registration to each of a selected plurality of points.

16. An apparatus according to claim 15, wherein the selected plurality of points are distributed in three dimensions, the selected plurality of points are distributed uniformly in three orthogonal directions, or both.

17. An apparatus according to claim 15, wherein the selected plurality of points are distributed symmetrically about the center of one of the region represented by the first set of image data, the region represented by the second set of data, and a region represented by both the first set of data and the second set of data.

18. An apparatus according to claim 15, wherein for each selected point, the distance from the selected point to the center of one of the region represented by the first set of data, the region represented by the second set of data, and a region represented by both the first set of data and the second set of data, is less than 50% of the minimum distance between the center of the region and the edge of the region.

19. An apparatus according to claim 1, wherein
for a plurality of first sets of image data and a plurality of second sets of image data, the circuit is configured to perform the first global registration and the second global registration between each of the plurality of first sets of image data and each of the plurality of second sets of image data;
the circuit is configured to determine a measure of registrability between each of the plurality of first sets of image data and each of the plurality of second sets of image data; and
the circuit is configured to select a set of first image data from the plurality of first image data sets and a second set of image data from the plurality of second sets of image data in dependence on the determined measure of registrability.

20. An apparatus according to claim 1, wherein
the circuit is configured to derive a transform from the first global registration between the first set of image data and the second set of data;
the derived transform is used to register a third set of image data and a fourth set of data.

21. An apparatus according to claim 1, wherein each registration comprises at least one of a rigid transform, a transformation comprising rotation, translation, and a uniform scaling component, an affine transformation, and a non-rigid transformation.

22. An apparatus according to claim 1, wherein each set of image data comprises a set of medical image data, each set of image data comprises at least one of CT data, MR data, PET data or SPECT data, or both.

23. A method for determining a measure of registrability between a first set of image data and a second set of data, comprising:
performing, with circuitry, a first global registration procedure on a first set of image data and a second set of image data to obtain a first global registration between the first set of image data and the second set of image data;
performing, with the circuitry, a second global registration procedure on the same first set of image data and the same second set of data to obtain a second global registration between the same first set of image data and the same second set of data, wherein the first global registration procedure is different from the second global registration procedure;
determining, with the circuitry, a difference between the first global registration and the second global registration;
determining, with the circuitry, the measure of registrability between the first set of image data and the second set of image data based on the difference between the first global registration and the second global registration;

accepting or rejecting, with the circuitry, registration of the first set of image data and the second set of image data depending upon the measure of registrability; and providing, with the circuitry, an indication that registration of the first set of image data and the second set of image data has been rejected and outputting, without registration, at least one of the first and second sets of image data when the registration is rejected, wherein performing the first global registration procedure includes obtaining a registration from the first set of image data to the second set of data and performing the second global registration procedure includes obtaining a registration from the second set of data to the first set of image data, or both.

24. A non-transitory computer-readable medium encoded with computer-readable instructions that, when executed by a computer, cause the computer to perform a method according to claim 23.

* * * * *